United States Patent
Kreiner et al.

(10) Patent No.: US 7,409,478 B2
(45) Date of Patent: Aug. 5, 2008

(54) PERIPHERAL HARDWARE DEVICES PROVIDING MULTIPLE INTERFACES AND RELATED SYSTEMS AND METHODS

(75) Inventors: Barrett Kreiner, Woodstock, GA (US); Jonathan Reeves, Roswell, GA (US)

(73) Assignee: AT&T Delaware Intellectual Property Inc., Wilmington, DE (US)

( * ) Notice: Subject to any disclaimer, the term of this patent is extended or adjusted under 35 U.S.C. 154(b) by 243 days.

(21) Appl. No.: 11/408,766

(22) Filed: Apr. 21, 2006

(65) Prior Publication Data

US 2008/0005368 A1    Jan. 3, 2008

(51) Int. Cl.
G06F 13/12 (2006.01)
G06F 13/00 (2006.01)

(52) U.S. Cl. ............................ 710/62; 710/72; 710/305; 713/189

(58) Field of Classification Search ............... 710/8–12, 710/62–63, 72, 305, 313; 713/189–192
See application file for complete search history.

(56) References Cited

U.S. PATENT DOCUMENTS

| | | | | |
|---|---|---|---|---|
| 5,615,344 | A * | 3/1997 | Corder | 710/62 |
| 6,654,817 | B1 * | 11/2003 | Huang | 710/1 |
| 6,985,988 | B1 * | 1/2006 | Nsame | 710/305 |
| 2003/0058274 | A1 * | 3/2003 | Hill et al. | 345/751 |
| 2003/0223585 | A1 * | 12/2003 | Tardo et al. | 380/277 |
| 2004/0098600 | A1 * | 5/2004 | Eldeeb | 713/189 |
| 2004/0123119 | A1 * | 6/2004 | Buer et al. | 713/189 |
| 2005/0172000 | A1 * | 8/2005 | Nakamura et al. | 709/203 |
| 2006/0245533 | A1 * | 11/2006 | Rostampour | 375/377 |

OTHER PUBLICATIONS

P.H.W. Long et al; "Pilchard—A Reconfigurable Computing Platform with Memory Slot Interface"; 2001 IEEE Symposium on Field-Programmable Custom Computing Machines (FCCM).
"Network-Drivers.com" 3Com 3C509 driver- 3Com Network Drivers—5x9c32.exe; http://www.network-drivers.com/drivers/155/155121.htm.
"Network-Drivers.com" 3Com.65507 driver—3Com Network Drivers—.65507; http://www.network-drivers.com/companies/2.htm.
"PCI on GlobalSpec"; Find PCI/Card/Compact/2.2 PCI Standard/PCI on GlobalSpec; http://pci.globalspec.com/.
"It's here. It's real. It's amazing. Mac OS X on Intel." http://www.apple.com/macosx/ .
Operating Systems; Sun Software; http://www.sun.com/software/index.jsp?cat=Operating%20Systems&tab=3.
Linux Os Download; The Linux Home Page at Linux Online; http://www.linux.org/.

* cited by examiner

*Primary Examiner*—Christopher B. Shin
(74) *Attorney, Agent, or Firm*—Myers Bigel Sibley & Sajovec

(57) ABSTRACT

A peripheral hardware device may be provided for a computing system including a software operating system. The peripheral hardware device may include functional electronics configured to provide functionality for the peripheral hardware device. The peripheral hardware device may also include interface electronics configured to provide communication between the functional electronics and the software operating system, wherein the interface electronics are configured to provide both a virtual network interface and a virtual serial interface with the software operating system. Related computing systems are also discussed.

26 Claims, 5 Drawing Sheets

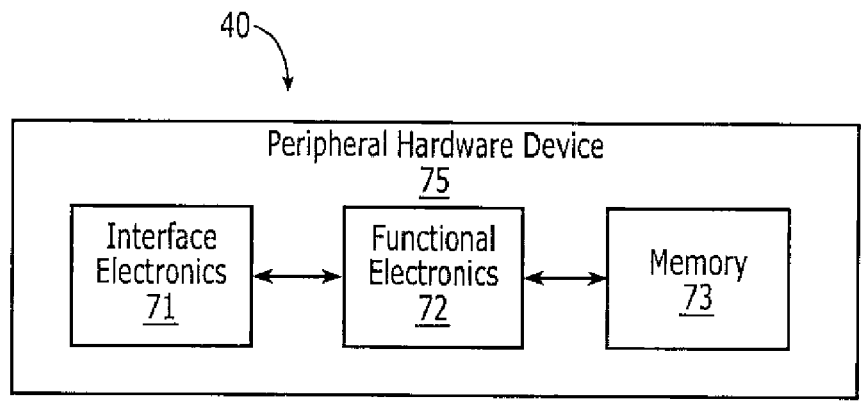

Figure 4

```
Connect com7:9600,n,8,1 newcard.com>  set ip address 10.0.2.4
newcard.com>  save
newcard.com>  exit
```

Figure 5A

```
C:/>ipconfig

Windows IP Configuration

Ethernet adapter {AB3398CD-60B3-40B3-8EE4-9DC71FA806C7}:

Connection-specific DNS Suffix ······: ad.bls.com
        IP Address ··························: 87.32.176.233
        Subnet Mask ·························: 255.255.240.0
        Default Gateway ·····················: 87.32.176.233

Ethernet adapter {AB3398CD-60B3-40B3-8EE4-000000000000}:

Connection-specific DNS Suffix ······: newcard.com
        IP Address ··························: 10.0.2.1
        Subnet Mask ·························: 255.255.255.0
        Default Gateway ·····················: 10.0.2.1
C:\>
```

Figure 5B

PERIPHERAL HARDWARE DEVICES PROVIDING MULTIPLE INTERFACES AND RELATED SYSTEMS AND METHODS

FIELD OF THE INVENTION

The present invention relates to the field of electronics, and more particularly to couplings between peripheral hardware devices and computing systems and related devices and methods.

BACKGROUND

In the field of computing devices, functionalities previously implemented using general purpose computing systems are now being implemented using new peripheral hardware devices, also referred to as peripheral devices. Standards for connections between peripheral devices include the USB (Universal Serial Bus) standard, the Firewire standard, the PCI (Peripheral Connector Interface) standard, etc. An additional interface is discussed, for example, by P. H. W. Leong, et al., in "Pilchard—A Reconfigurable Computing Platform With Memory Slot Interface," 2001, IEEE, Symposium On Field-Programmable Custom Computing Machines (FCCM). The disclosure of the Leong et al. reference is hereby incorporated herein in its entirety by reference.

Most computing systems run using an operating system, such as a Windows operating system, a Linux operating system, a Unix operating system, an Apple/Macintosh operating system, etc. The different operating systems, however, cannot generally exchange device drivers and/or code that allow a peripheral hardware device to interact with the operating system. Moreover, even if a custom peripheral hardware device is provided with an appropriate device driver for a particular operating system, custom code may still be required within the operating system to allow interaction between the operating system and the peripheral hardware device.

SUMMARY

According to embodiments of the present invention, a peripheral hardware device may be provided for a computing system including a software operating system. The peripheral hardware device may include functional electronics configured to provide functionality for the peripheral hardware device. The peripheral hardware device may also include interface electronics configured to provide communication between the functional electronics and the software operating system. More particularly, the interface electronics may be configured to provide both a virtual network interface and a virtual serial interface with the software operating system. Accordingly, the virtual network and serial interfaces may appear to the software operating system as physical network and serial interfaces even though the peripheral hardware device may not actually have physical connections for network and/or serial communications.

In addition, a card may be configured to provide electrical and mechanical interconnection in a port of the computing system, and the functional electronics and the interface electronics may be provided as electronic devices on the card. For example, the card may be configured to provide electrical and mechanical interconnection in a PCI (Peripheral Connector Interface) port of the computing system. The virtual network interface may include a virtual Ethernet interface, and/or the virtual serial interface may include a virtual universal asynchronous receiver-transmitter (UART) interface. Moreover, the functional electronics may provide functionality of a co-processor and/or a cryptographic accelerator.

The interface electronics may be configured to provide set/up and/or configuration communications using the virtual serial interface, and the interface electronics may be configured to provide communications for the functionality of the peripheral hardware device using the virtual network interface. The set/up and/or configuration communications may be provided using remote procedure calls, and/or the communications for the functionality of the peripheral hardware device may be provided using at least one of a TCP/IP (Transmission Control Protocol/Internet Protocol) standard, a Common Object Request Broker Architecture (CORBA) standard, a Web Service call standard, a Message Queuing (MQ) standard, and/or a Distributed Component Object Model (DCOM) standard.

According to additional embodiments of the present invention, a computing system may include a memory including a software operating system, a processor coupled to the memory and configured to run the software operating system, and a peripheral hardware device coupled to the processor. More particularly, the peripheral hardware device may include functional electronics configured to provide functionality for the peripheral hardware device. The peripheral hardware device may also include interface electronics configured to provide communication between the functional electronics and the processor running the software operating system. Moreover, the interface electronics may be configured to provide both a virtual network interface and a virtual serial interface with the software operating system. Accordingly, the interface electronics may be configured to provide the appearance of network and serial interfaces with respect to the software operating system to provide an access mechanism(s) with respect to configuration and/or functionality of the peripheral hardware device.

A port may be coupled between the processor and the peripheral hardware device, and the peripheral hardware device may include a card configured to provide electrical and mechanical interconnection with the port. In addition, the functional electronics and the interface electronics may be provided as electronic devices on the card. The port may be a PCI (Peripheral Connector Interface) port of the computing system, the virtual network interface may be a virtual Ethernet interface, and/or the virtual serial interface may be a virtual universal asynchronous receiver-transmitter (UART) interface. The functional electronics may provide functionality of a co-processor and/or a cryptographic accelerator.

The interface electronics may be configured to provide set/up and/or configuration communications using the virtual serial interface, and the interface electronics may be configured to provide communications for the functionality of the peripheral hardware device using the virtual network interface. For example, the set/up and/or configuration communications may be provided using remote procedure calls. The communications for the functionality of the peripheral hardware device may be provided using at least one of a TCP/IP (Transmission Control Protocol/Internet Protocol) standard, a Common Object Request Broker Architecture (CORBA) standard, a Web Service call standard, a Message Queuing (MQ) standard, and/or a Distributed Component Object Model (DCOM) standard.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

FIG. 4 is a block diagram illustrating peripheral hardware devices according to embodiments of the present invention.

FIGS. 5a-c are screen shots illustrating access to a peripheral hardware device according to embodiments of the present invention.

DETAILED DESCRIPTION

Figure 1:
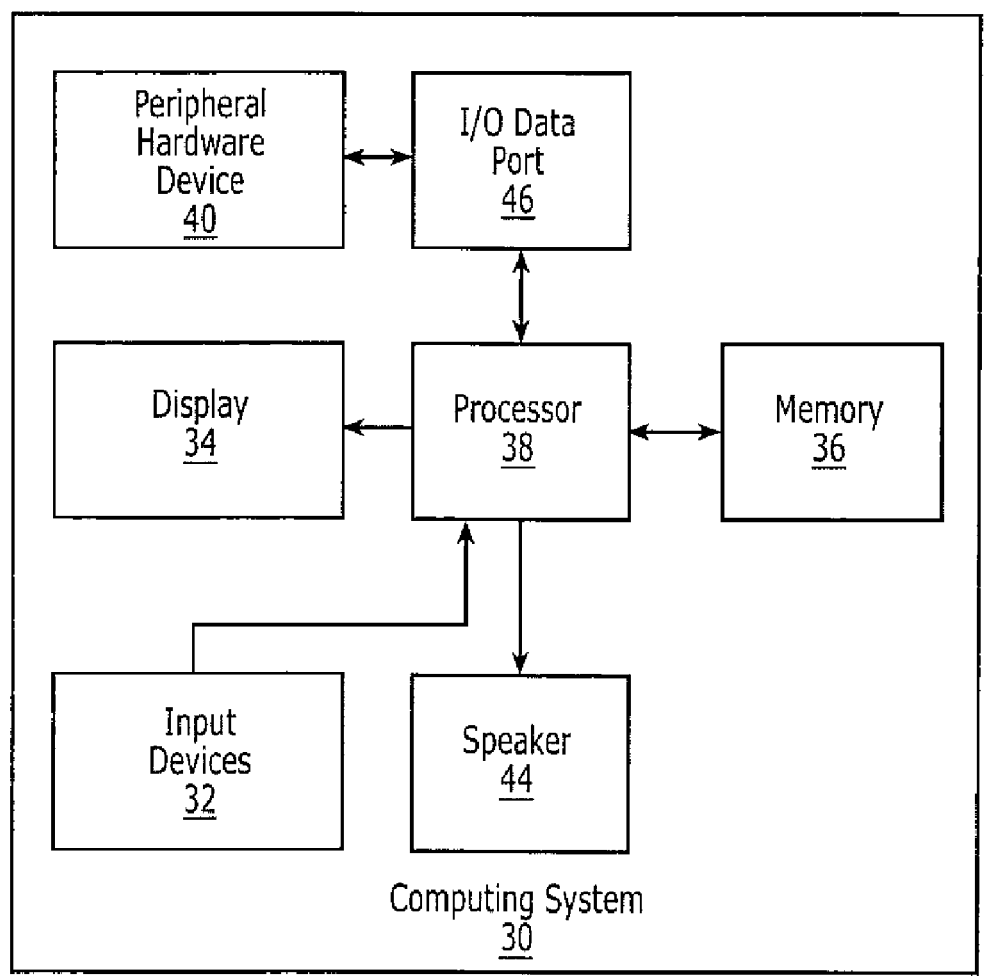
FIG. 1 is a block diagram illustrating computing systems according to embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first multimedia device could be termed a second multimedia device, and, similarly, a second multimedia device could be termed a first multimedia device without departing from the teachings of the disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as methods, computing systems, and/or computer program products. Accordingly, embodiments of the present invention may take the form of an entirely hardware embodiment, an entirely software embodiment (including firmware, resident software, micro-code, etc.) or an embodiment combining software and hardware aspects. Furthermore, embodiments of the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written, for example, in an object oriented programming language such as JAVA®, Smalltalk, and/or C++. However, the computer program code for carrying out operations of embodiments of the present invention may also be written in conventional procedural programming languages, such as the "C" programming language or in a visually oriented programming environment, such as VisualBasic.

The invention is described in part below with reference to block diagrams of methods, systems and/or computer program products according to embodiments of the invention. It will be understood that each block of the illustrations, and combinations of blocks, can be implemented by computer program instructions. These computer program instructions may be provided to a processor of a general purpose computer, special purpose computer, or other programmable computing apparatus to produce a machine, such that the instructions, which execute via the processor of the computer or other programmable computing apparatus, create means for implementing the functions/acts specified in the block or blocks.

These computer program instructions may also be stored in a computer-readable memory that can direct a computer or other programmable computing apparatus to function in a particular manner, such that the instructions stored in the computer-readable memory produce an article of manufacture including instruction means which implement the function/act specified in the block or blocks.

The computer program instructions may also be loaded onto a computer or other programmable computing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Embodiments of the present invention will now be discussed with respect to FIGS. 1 through 5. Referring now to FIG. 1, a block diagram of computing systems according to some embodiments of the present invention will be discussed. As illustrated in FIG. 1, some embodiments of a computing system 30 may include input device(s) 32 (such as a keyboard, keypad, joystick, mouse, touch sensitive display, etc.), a display 34, and a memory 36 that communicate with a processor 38. The computing system 30 may further include a speaker 44 and an input/output (I/O) data port(s) 46 that also communicate with the processor 38. The I/O data ports 46 can be used to accept peripheral hardware devices and/or to transfer information between the computing system 30 and another computer system or a network. These components may be conventional components, such as those used in many conventional computing systems, which may be configured to operate as described herein.

The computing system of FIG. 1 may also include a peripheral hardware device 40 according to embodiments of the present invention. As shown, the peripheral hardware device 40 may be coupled to the processor 38 and/or the memory 36 via one or more of the I/O data port(s) 46. More particularly, the I/O data port(s) 46 may include a slot according to the Peripheral Connector Interface (PCI) standard, and the peripheral hardware device 40 may be configured as a card to provide mechanical and electrical coupling with the slot according to the PCI standard. The peripheral hardware device 40 may be configured to provide additional functionality for the computing system 30. The peripheral hardware device 40, for example, may provide the functionality of a coprocessor and/or a cryptographic accelerator.

Figure 2:
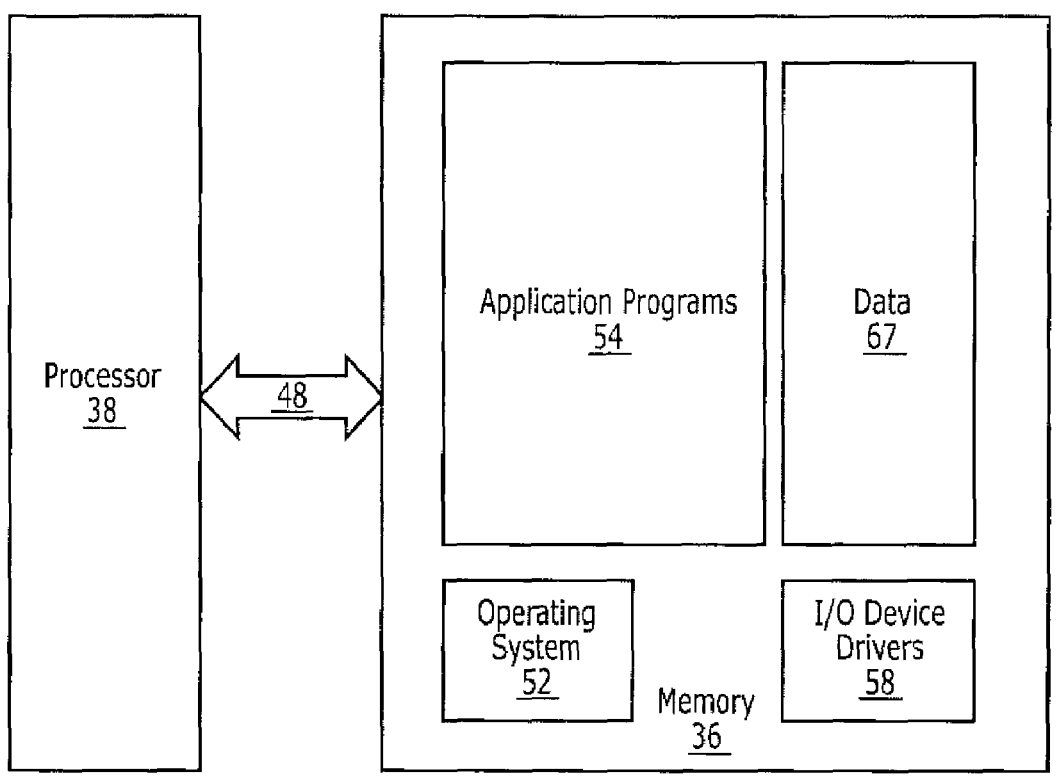
FIG. 2 is a block diagram illustrating memory arrangements for computing systems according to embodiments of the present invention.

FIG. 2 is a block diagram of computing systems that illustrate systems, methods, and/or computer program products in accordance with embodiments of the present invention. The processor 38 communicates with the memory 36 via an address/data bus 48. The processor 38 can be any commercially available or custom processor, such as a microprocessor. The memory 36 is representative of the overall-hierarchy of memory devices containing the software and data used to implement the functionality of the computing system 30. The memory 36 can include, but is not limited to, the following types of devices: cache, ROM, PROM, EPROM, EEPROM, flash memory, SRAM and/or DRAM. Moreover, the processor 38 of FIG. 2 may be coupled to I/O data port(s) 46, display 34, input devices 32, and/or speaker 44 as discussed above with respect to FIG. 1.

As shown in FIG. 2, the memory 36 may include several categories of software and data used in the computing system 30: an operating system 52; application programs 54; input/output (I/O) device drivers 58; and data 67. As will be appreciated by those of skill in the art, the operating system 52 may be any operating system suitable for use with a computing system, such as AIX or System390 from International Business Machines Corporation, Armonk, N.Y.; Windows95, Windows98, Windows2000 or WindowsXP from Microsoft Corporation, Redmond, Wash.; Unix; Linux; Mac OS X from Apple Computer, Inc.; and/or Solaris Operating System from Sun Microsystems, Inc. The I/O device drivers 58 typically include software routines accessed through the operating system 52 by the application programs 54 to communicate with devices such as the I/O data port(s) 46, certain memory 36 components, and/or one or more peripheral hardware devices coupled to the computing system 30 through I/O data port(s) 46. The application programs 54 are illustrative of the programs that implement the various features of the computing system 30. Finally, the data 67 represents the static and dynamic data used by the application programs 54, the operating system 52, the I/O device drivers 58, and other software programs that may reside in the memory 36.

While embodiments of the present invention are illustrated in FIGS. 1 and 2 with reference to particular divisions between application programs, data and the like, the present invention should not be construed as limited to configurations of FIGS. 1 and 2 but is intended to encompass any configuration capable of carrying out operations described herein.

The I/O data port(s) 46, the processor 38, and/or the memory 36 may thus provide coupling between the operating system 52, one or more device drivers 58, and the peripheral hardware device 40 according to embodiments of the present invention. Resulting functional couplings between a peripheral hardware device according to embodiments of the present invention and other elements of FIGS. 1 and/or 2 are illustrated in FIG. 3.

Figure 3:
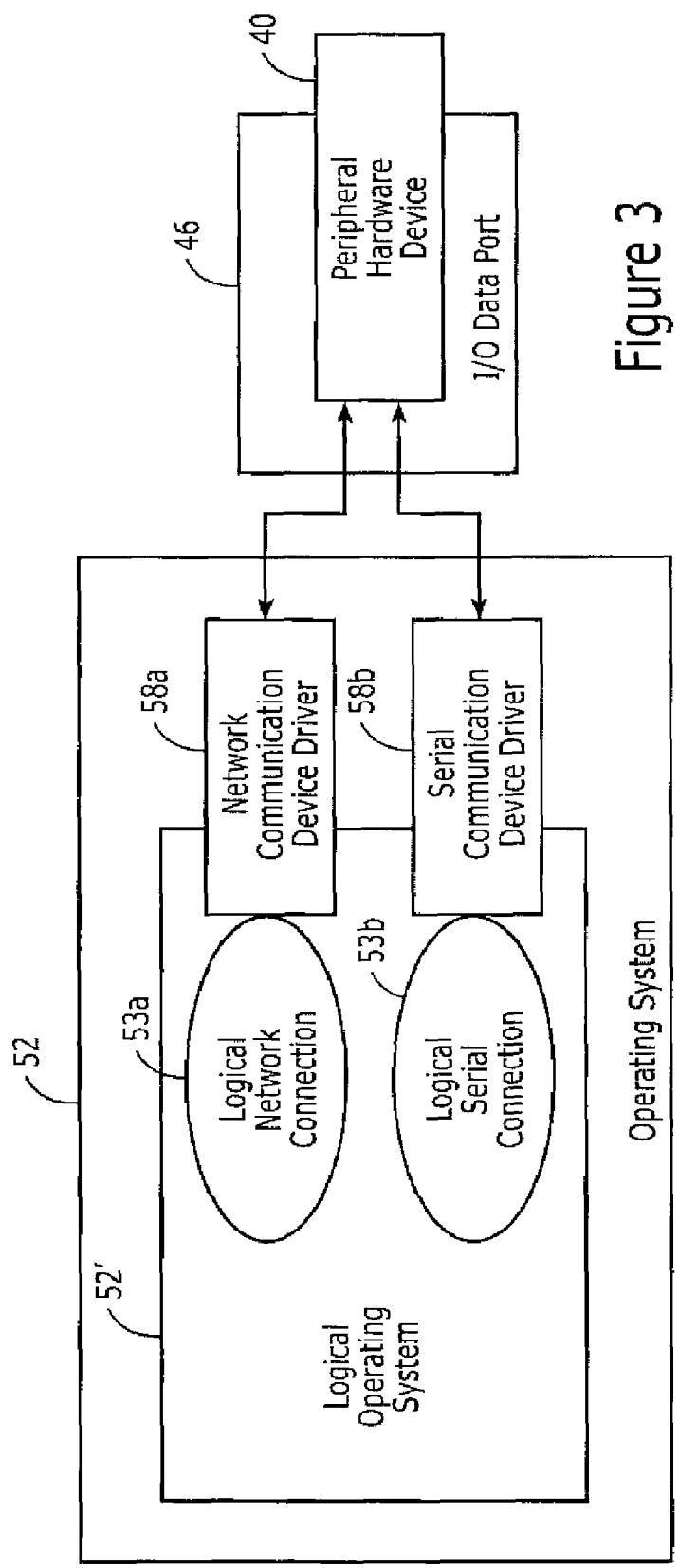
FIG. 3 is a block diagram illustrating couplings between peripheral hardware devices and operating systems according to embodiments of the present invention.

As shown in FIG. 3, the operating system 52 may present a logical operating system 52' to provide a logical representation of elements of the computing system 30. Moreover, the logical operating system 52' may provide logical network connection 53a and logical serial communication 53b coupling to the peripheral hardware device 40 using respective network device driver 58a and serial communication device driver 58b (of the I/O device drivers 58) and the I/O data port 46. As discussed above, electrical and mechanical coupling between the I/O data port 46 and the peripheral hardware device 40 may be provided according to the PCI standard.

As shown in FIG. 4, the peripheral hardware device 40 may include interface electronics 71, functional electronics 72, and memory 73 on a card 75 configured to provide mechanical and electrical coupling with the I/O data port 46, for example, according to the PCI standard. The functional electronics 72 may be configured to provide functionality for the peripheral hardware device. For example, the functional electronics may be configured to provide functionality of a coprocessor and/or a cryptographic accelerator. Moreover, the interface electronics 71 may be configured to provide communication between the functional electronics 72 and the software operating system 52. For example, the interface electronics 71 may be configured to provide both a virtual network interface and a virtual serial interface with the software operating system 52 through the network communication device driver 58a and the serial communication device driver 58b, respectively.

The peripheral hardware device 40 may also include optional memory 73 coupled to the functional electronics 72 and/or the interface electronics 71. While the interface electronics 71, the functional electronics 72, and the memory 73 are shown as separate functional blocks in FIG. 4, functional elements thereof may be provided in different groupings. Moreover, the card 75 including the interface electronics 71, the functional electronics 72, and the memory 73 (if provided) may be provided on a single printed circuit board configured for coupling in a single I/O data port 43 such as a single slot of an I/O data port according to the PCI standard.

Accordingly, a peripheral hardware device 40 on a single card 75 may be configured to communicate with the operating system 52 of the computing system 30 using both network and serial communications links. The interface electronics 71 may be configured to provide network communications according to an Ethernet network communications standard, and the network communications device driver 58a may be a standard Ethernet network device driver, for example, according to a 3C509 standard. In addition, the interface electronics 71 may be configured to provide serial communications according to a universal asynchronous receiver-transmitter (UART) standard, and the network communications device driver 58b may be a standard UART serial communications device driver.

The interface electronics 71 may be configured to provide communications for functionality of the peripheral hardware device 40 using the vitual network interface through the network communications device driver 58a. For example, communications for functionality of the peripheral hardware device 40 may be provided using at least one of a TCP/IP (Transmission Control Protocol/Internet Protocol) standard, a Common Object Request Broker Architecture (CORBA) standard, a Web Service call standard, a Message Queuing (MQ) standard, and/or a Distributed Component Object Model (DCOM) standard. The interface electronics 71 may also be configured to provide set/up and/or configuration communications using a virtual serial interface through the serial communications device driver 58b. For example, set/up and/or configuration communications may be provided using remote procedure calls.

The peripheral hardware device 40 can thus present itself to the operating system 52 as a network device using one or more conventional device drivers so that different functionalities can be developed for peripheral hardware devices according to embodiments of the present invention without requiring development of different/custom device drivers. By using standard network and/or serial communications standards as discussed above, standard device drivers included in many different operating systems can be used for new and/or different peripheral hardware devices providing new and/or different functionalities. Cost and/or time associated with development of device drivers for peripheral hardware devices according to embodiments of the present invention can thus be reduced.

Figure 5C:
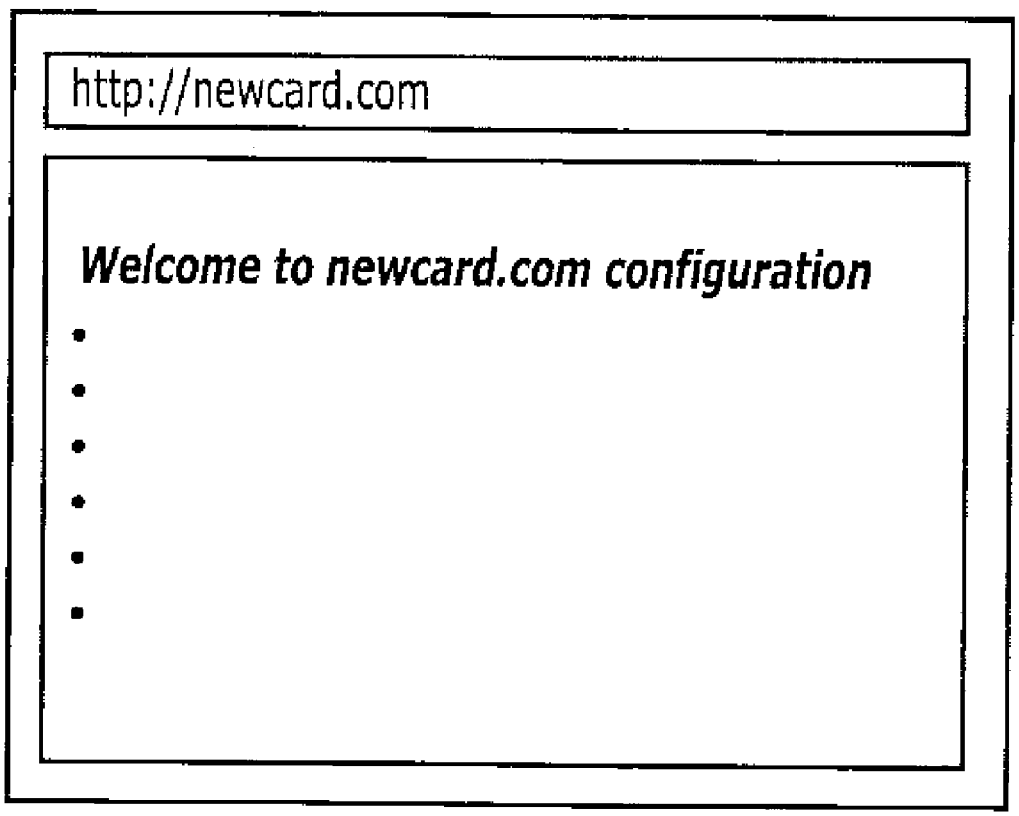

FIGS. 5a-c are screen shots illustrating access to the peripheral hardware device 40 according to embodiments of the present invention. As shown in FIG. 5a, interaction with the peripheral hardware device 40 (named "newcard" for the sake of illustration) may be provided using a Hyperterminal utility to provide configuration of the peripheral hardware device 40 as a virtual communications port. As shown in FIG. 5b, once the peripheral hardware device 40 has been installed in the computing system 30 and configured according to embodiments of the present invention, the peripheral hardware device 40 may appear to the operating system 52 as a virtual Ethernet network interface card even though no network connection is provided. Moreover, the peripheral hardware device 40 may be manipulated using a browser such as Internet Explorer as shown in FIG. 5c.

According to some embodiments of the present invention, the interface electronics 71 of the peripheral hardware device 40 may thus be configured to emulate a plurality of interface standards for communication with the operating system 52 using standard device drivers 58. For example, the functional electronics 72 of the peripheral hardware device 40 may provide co-processing for the acceleration of cryptography, and the peripheral hardware device 40 may be provided as a card according to the PCI standard to provide coupling with a PCI I/O data port 46. Moreover, the interface electronics 71 of the peripheral hardware device 40 may be configured to appear to the operating system 52 as a virtual UART with a serial port (for configuration of the peripheral hardware device 40) and to appear to the operating system 52 as a virtual Ethernet card(s), for example, by emulating a chip according to a RT8111 chip (for communications supporting functionality of the peripheral hardware device 40). A command interface can thus be provided using a virtual serial interface of the interface electronics 71, and a functional interface can be provided using a virtual network interface of the interface electronics 71.

By emulating known serial and network interfaces, standard device drivers included in many conventional operating systems may be used to support communications with peripheral hardware devices providing new and/or different functionalities. Accordingly, development of new device drivers for different operating systems is not required for new and/or different peripheral hardware devices according to embodiments of the present invention. Moreover, development and/or adaptation of libraries for different operating systems may not be required for new and/or different peripheral hardware devices according to embodiments of the present invention. A same peripheral hardware device according to embodiments of the present invention may thus be more easily installed/integrated/configured in different computing systems using different operating systems.

Functionality of peripheral hardware devices according to embodiments of the present invention can thus be exposed through the operating system as a virtual network interface, for example, using TCP/IP calls, CORBA calls, MQ calls, DCOM calls, and/or Web Service calls, for which libraries and device drivers are already available for many different operating systems. Development for different peripheral hardware devices providing different functionalities can thus be reduced. Moreover, a physical location (either local/internal or remote/external) of a peripheral hardware device according to embodiments of the present invention may be transparent to an application program using the peripheral hardware device. A peripheral hardware device according to some embodiments of the present invention may thus be off-host as a true network device.

Regarding real/physical network and/or serial ports on a PCI slot, a PCI port may appear to the host computer and/or operating system thereof as a series of registers, interrupts, and/or memory regions that are used to exchange data between the host and the real/physical network. When moving data from a host program to the real/physical network, the program's data memory region is copied to a region controlled by the network card, and a register is set to tell the card to take the data in its buffer and transmit it over the physical network. When data arrives over from the physical network, the card puts the data into a host-visible memory region and triggers an interrupt to let the host know there is data to be picked up and given to an application. Virtual network and/or serial interfaces according to embodiments of the present invention may thus provide the appearance of real/physical network and/or serial interfaces to a host/driver of the host computing system. Accordingly, the same registers, interrupts, and memory regions that the driver expects to be provided for a real/physical network and/or serial card may be simulated by the interface electronics 71 according to embodiments of the present invention.

In the drawings and specification, there have been disclosed embodiments of the invention. However, many variations and modifications can be made to these embodiments without departing from the principles of the present invention. All such variations and modifications are intended to be That which is claimed is:

1. A peripheral hardware device for a computing system, wherein the computing system includes a memory with a software operating system, a network device driver, and a serial communications device driver, and a processor configured to run the software operating system, the network device driver, and the serial communications device driver, the peripheral hardware device comprising:
   functional electronics configured to provide functionality for the peripheral hardware device; and
   interface electronics configured to provide communication between the functional electronics and the software operating system, wherein the interface electronics are configured to provide both a virtual network interface between the functional electronics and the processor running the network device driver and a virtual serial interface between the functional electronics and the processor running the serial communications device driver, wherein the virtual network interface and the virtual serial interface are provided between the functional electronics and the processor running the network device driver, the serial communications device driver, and the software operating system.

2. A peripheral hardware device according to claim 1 further comprising:
   a printed circuit board configured to provide electrical and mechanical interconnection in a port of the computing system, wherein the functional electronics and the interface electronics are provided as electronic devices on the printed circuit board so that the interface electronics on the printed circuit board are configured to provide both the virtual network interface between the functional electronics on the printed circuit board and the processor running the network device driver, and the virtual serial interface between the functional electronics on the printed circuit board and the processor running the serial communications device driver, and wherein the virtual network interface and the virtual serial interface are provided through the port.

3. A peripheral hardware device according to claim 2 wherein the port comprises a PCI (Peripheral Connector interface) port of the computing system.

4. A peripheral hardware device according to claim 1 wherein the virtual network interface comprises a virtual Ethernet interface and wherein the network device driver comprises an Ethernet network device driver.

5. A peripheral hardware device according to claim 1 wherein the virtual serial interface comprises a virtual universal asynchronous receiver-transmitter (UART) interface and wherein the serial communications device driver comprises a UART serial communications device driver.

6. A peripheral hardware device according to claim 1 wherein the functional electronics comprises a co-processor.

7. A peripheral hardware device according to claim 1 wherein the functional electronics comprises a cryptographic accelerator.

8. A peripheral hardware device according to claim 1 wherein the interface electronics are configured to provide set/up and/or configuration communications using the virtual serial interface and wherein the interface electronics are configured to provide communications for the functionality of the peripheral hardware device using the virtual network interface.

9. A peripheral hardware device according to claim 8 wherein the set/up and/or configuration communications are provided using remote procedure calls.

10. A peripheral hardware device according to claim 8 wherein the communications for the functionality of the peripheral hardware device are provided using at least one of a TCP/IP (Transmission Control Protocol/Internet Protocol) standard, a Common Object Request Broker Architecture (CORBA) standard, a Web Service call standard, a Message Queuing (MQ) standard, and/or a Distributed Component Object Model (DCOM) standard.

11. A computing system comprising:
   a memory including a software operating systems, a network device driver, and a serial communications device driver;
   a processor coupled to the memory and configured to run the software operating system, the network device driver, and the serial communications device driver; and
   a peripheral hardware device coupled to the processor, the peripheral hardware device including,
      functional electronics configured to provide functionality for the peripheral hardware device, and
      interface electronics configured to provide communication between the functional electronics and the processor running the software operating system, wherein the interface electronics are configured to provide both a virtual network interface between the functional electronics and the processor running the network device driver and a virtual serial interface between the functional electronics and the processor running the serial communications device driver, wherein the virtual network interface and the virtual serial interface are provided between the functional electronics and the processor running the network device driver, the serial communications device driver, and the software operating system.

12. A computing system according to claim 11 further comprising:
   a port coupled between the processor and the peripheral hardware device, wherein the peripheral hardware device further includes a printed circuit board configured to provide electrical and mechanical interconnection with the port, and wherein the functional electronics and the interface electronics are provided as electronic devices on the printed circuit board so that the interface electronics on the printed circuit board are configured to provide both the virtual network interface between the functional electronics on the printed circuit board and the processor running the network device driver and the virtual serial interface between the functional electronics on the printed circuit board and the processor running the serial communications device driver, and wherein the virtual network interface and the virtual serial interface are provided through the port.

13. A computing system according to claim 12 wherein the port comprises a PCI (Peripheral Connector Interface) port of the computing system.

14. A computing system according to claim 11 wherein the virtual network interface comprises a virtual Ethernet interface and wherein the network device driver comprises an Ethernet network device driver.

15. A computing system according to claim 11 wherein the virtual serial interface comprises a virtual universal asynchronous receiver-transmitter (UART) interface and wherein the serial communications device driver comprises a UART serial communications device driver.

16. A computing system according to claim 11 wherein the functional electronics comprises a co-processor.

17. A computing system according to claim 11 wherein the functional electronics comprises a cryptographic accelerator.

18. A computing system according to claim 11 wherein the interface electronics are configured to provide set/up and/or configuration communications using the virtual serial interface and wherein the interface electronics are configured to provide communications for the functionality of the peripheral hardware device using the virtual network interface.

19. A computing system according to claim 18 wherein the set/up and/or configuration communications are provided using remote procedure calls.

20. A computing system according to claim 18 wherein the communications for the functionality of the peripheral hardware device are provided using at least one of a TCP/IP (Transmission Control Protocol/Internet Protocol) standard, a Common Object Request Broker Architecture (CORBA) standard, a Web Service call standard, a Message Queuing (MQ) standard, and/or a Distributed Component Object Model (DCOM) standard.

21. A peripheral hardware device according to claim 3 wherein the virtual network interface comprises a virtual Ethernet network interface, and wherein the virtual serial interface comprises a virtual universal asynchronous receiver-transmitter (UART) serial communications interface, wherein the network device driver comprises an Ethernet network device driver, and wherein the serial communications device driver comprises a universal asynchronous receiver-transmitter (UART) serial communications device driver.

22. A peripheral hardware device according to claim 21 wherein the interface electronics are configured to provide set/up and/or configuration communications using the virtual universal asynchronous receiver-transmitter (UART) serial communications interface and remote procedure calls, and wherein the interface electronics are configured to provide communications for the functionality of the peripheral hardware device using the virtual Ethernet network interface and using at least one of a TCP/IP (Transmission Control Protocol/Internet Protocol) standard, a Common Object Request Broker Architecture (CORBA) standard, a Web Service call standard, a Message Queuing (MQ) standard, and/or a Distributed Component Object Model (DCOM) standard.

23. A computing system according to claim 22 wherein the functional electronics comprises a co-processor and/or a cryptographic accelerator.

24. A computing system according to claim 13 wherein the virtual network interface comprises a virtual Ethernet network interface, wherein the virtual serial interface comprises a virtual universal asynchronous receiver-transmitter (UART) serial communications interface, wherein the network device driver comprises an Ethernet network device driver, and wherein the serial communications device driver comprises a universal asynchronous receiver-transmitter (UART) serial communications device driver.

25. A computing system according to claim 24 wherein the interface electronics are configured to provide set/up and/or configuration communications using the virtual universal asynchronous receiver-transmitter (UART) serial communications interface and remote procedure calls, and wherein the interface electronics are configured to provide communications for the functionality of the peripheral hardware device using the virtual Ethernet network interface and using at least one of a TCP/IP (Transmission Control Protocol/Internet Protocol) standard, a Common Object Request Broker Architecture (CORBA) standard, a Web Service call standard, a Message Queuing (MQ) standard, and/or a Distributed Component Object Model (DCOM) standard.

26. A computing system according to claim 25 wherein the functional electronics comprises a co-processor and/or a cryptographic accelerator.

* * * * *